United States Patent [19]

Watanabe et al.

[11] Patent Number: 4,559,390

[45] Date of Patent: Dec. 17, 1985

[54] METHOD FOR PREVENTING DEGRADATION AND DETERIORATION OF VULCANIZED RUBBER MATERIAL

[75] Inventors: Noboru Watanabe, Yokohama; Motofumi Oyama, Yokosuka; Yoichiro Kubo, Yokohama, all of Japan

[73] Assignee: Nippon Zeon Co., Ltd., Tokyo, Japan

[21] Appl. No.: 617,848

[22] Filed: Jun. 7, 1984

Related U.S. Application Data

[63] Continuation-in-part of Ser. No. 495,821, May 18, 1983, abandoned.

[30] Foreign Application Priority Data

May 18, 1982 [JP] Japan .................................. 57-83745

[51] Int. Cl.[4] ...................... C08F 19/20; C08F 19/00
[52] U.S. Cl. .................................... 525/349; 166/243; 525/338; 525/339; 525/352; 525/387
[58] Field of Search ............... 525/327.3, 329.3, 329.5, 525/338, 339, 328.9, 349, 352, 387, 330.4, 330.9, 332.6; 526/273, 292.6, 317, 320, 329.1, 338

[56] References Cited

U.S. PATENT DOCUMENTS

| | | | |
|---|---|---|---|
| 3,868,354 | 2/1975 | Halasa | 525/338 |
| 3,872,072 | 3/1975 | Halasa | 525/233 |
| 3,882,094 | 5/1975 | Halasa | 525/338 |
| 4,337,329 | 6/1982 | Kubo | 525/339 |
| 4,350,796 | 9/1982 | Oyama | 525/233 |
| 4,384,081 | 5/1983 | Kubo | 525/339 |
| 4,404,329 | 9/1983 | Maeda | 525/329.2 |
| 4,405,756 | 9/1983 | Oyama | 525/237 |

*Primary Examiner*—Christopher A. Henderson
*Attorney, Agent, or Firm*—Sherman & Shalloway

[57] ABSTRACT

A method of preventing degradation of vulcanized rubber materials used in the operation of oil and gas wells comprising forming said rubber material from a sulfur vulcanized composition comprising a copolymer rubber having in the polymer chain (I) 10 to 60% by weight of a unit from an unsaturated nitrile, (II) not more than 10% by weight of a unit from a conjugated diene, and (III) 30 to 90% by weight of a unit from an ethylenically unsaturated monomer other than the unsaturated nitrile and/or a unit resulting from the hydrogenation of a unit from a conjugated diene, said rubber being vulcanized with a sulfur vulcanization system.

6 Claims, No Drawings

METHOD FOR PREVENTING DEGRADATION AND DETERIORATION OF VULCANIZED RUBBER MATERIAL

This application is a continuation-in-part of application Ser. No. 495,821, filed May 18, 1983, now abandoned.

BACKGROUND OF THE INVENTION

This invention relates to a rubber material vulcanized with a sulfur vulcanization system, which has excellent oil resistance and antidegrading properties and is particularly adapted for use in contact with casing head gas and/or crude oil.

Today, more than 75% of world energy supply relies on crude oils and natural gases recovered from wells. In spite of the estimated future increase of energy consumption, however, it has become difficult to discover new oil or gas wells. Efforts have therefore been made to discover new wells, and attempts have been made at the same time to increase the yield of crude oils or natural gases from the wells now in operation.

To recover crude oils or natural gases, drilling of wells is first performed. To increase the drilling efficiency at this time, various improved drilling oils, drilling fluids, etc. are used. Then, an iron pipe called a casing pipe is inserted from above the ground into a bare hole with a diameter of 20 cm to about 60 cm formed in the stratum by drilling. The well is completed by using cement, rubber materials, etc. so as to enable oil recovery. Crude oil is recovered from the completed well by spontaneous flowing, pumping, etc.

However, rocks, mud and sand from the drilled stratum, and the drilling oil or fluid used during the drilling operation deposit and build up near the well, and this may markedly hamper recovery of crude oil. In such a case, measures are taken to increase oil producing ability by, for example, adding a liquid obtained by mixing kerosene, light oil or diesel oil with an acid, an alkali, chlorine or various surface-active agents to the well in advance to dissolve or disperse the sediment, etc. and discharging them out of the well.

When the crude oil has difficulty of flowing into the well because of asphalt or wax components deposited near the well as a result of long-term operation, or because of the high viscosity of the crude oil in the oil reservoir, it is the practice to force steam into the well to dissolve the deposits or decrease the viscosity of the crude oil.

The ratio of recovery of crude oil from the oil reservoir is very low if the flow of the crude oil into the well is effected only by natural energy. Thus, in order to increase the yield of oil, various treatments have been performed. For example, water is forced into the oil reservoir to increase the pressure of the oil reservoir, or steam is added to increase the temperature of the oil reservoir. Or $CO_2$ or LPG is forced into the crude oil to reduce its viscosity, or the surface tension between oil and another material is reduced. As a result, the inside of the well has very high pressures and temperatures (usually at least 150° C.). Crude oils or natural gases recovered from the wells contain large amounts of corrosive $CO_2$ and sulfur compounds such as $H_2S$.

Accordingly, an environment with which rubber materials used for well completion make contact is very severe.

An acrylonitrile/butadiene copolymer rubber (to be referred to as NBR) has previously been used in large amounts as rubber materials for wells (oil and gas wells). Rubber materials composed of NBR, however, become useless within a short period of time under severe high-temperature, high-pressure environmental conditions by the action of crude oil, hydrocarbon gases, $H_2S$, $CO_2$, acids, alkalies, etc. Fluoro-rubber proposed as a material intended for removing the defect of NBR has low mechanical properties such as tensile strength and tear strength, and does not have sufficient resistance to the action of the aforesaid substances. For this reason, it has been desired to develop new rubber materials.

Rubber materials used in wells are required not only to have high mechanical strength and resistance to crude oils, but also have resistance to additive materials used in various treatments performed to increase the yield of oil, $H_2S$, $CO_2$, or a mixture of these, and resistance to heat. If they lack a balance of mechanical strength, resistance to the aforesaid substances and heat resistance, they do not function as rubber materials. Ideally, such rubber materials can be used until the well dries up. In practice, however, they have to be exchanged every time they become degraded. Since this requires extra work for exchanging and for interruption of production owing to exchanging, it gives rise to an economic problem.

SUMMARY OF THE INVENTION

It is an object of this invention to provide a rubber material which has a well-balanced combination of mechanical strength, resistance to the various substances described above and heat resistance and is particularly adapted for use in contact with crude oils or gases in oil and gas wells.

The present inventors have made extensive investigations in order to achieve this object. These investigations have led to the surprising discovery that a rubber material having a very good balance of the above properties can be obtained by vulcanizing an unsaturated nitrile/conjugated diene copolymer rubber composed of specified proportions of (I) an unsaturated nitrile unit, (II) a conjugated diene unit and (III) a saturated unit, or a partially hydrogenated product thereof, with a sulfur vulcanization system.

The rubber material in accordance with this invention is used in contact with crude oils from oil or gas wells, natural gases called casing head gas, corrosive gases such as sulfur compounds (e.g., $H_2S$ and $SO_2$), steam and $CO_2$, mixtures of these gases, and various additives used in well treatment. It is an excellent rubber material having a well-balanced combination of mechanical strength, heat resistance, resistance to corrosive gases of an oil well, crude oil resistance, and resistance to treating additives.

The characteristic feature of the invention lies in the fact that the specified rubber material described in detail hereinbelow is vulcanized with a sulfur vulcanization system. If an organic peroxide is used as a vulcanizer, a rubber material having the aforesaid properties in good balance cannot be obtained.

As stated hereinabove, mineral oils such as kerosene, light oil and diesel oil, with or without acids such as hydrochloric acid, acetic acid, sulfuric acid or nitric acid for dissolving reservoir rocks, are usually added during treatment of wells. There are also added alkalies such as sodium hydroxide and potassium hydroxide in order to neutralize the carboxyl and sulfo groups in the crude oil; metal chlorides such as sodium chloride and calcium chloride and other metal compounds to adjust viscosity; surface active agents such as sodium alkylarylsulfonates, fatty acids, and sulfates of alcohols to improve oil penetration; and acetamide, aliphatic amines and quaternary ammonium salts to prevent corrosion of the iron pipes. Various other materials are added. These materials, either individually or synergistically, affect the rubber materials used.

The entire rubber material of this invention or that surface of the rubber material of this invention which is to make contact with the aforesaid crude oil, casing head gas, etc. is formed of the unsaturated nitrile-conjugated diene copolymer specified in the present invention.

DESCRIPTION OF THE PREFERRED EMBODIMENTS

The unsaturated nitrile-conjugated diene polymer rubber used in this invention is a copolymer rubber which has in the polymer chain (I) a unit from an unsaturated nitrile, (II) a unit from a conjugated diene and (III) a unit from an ethylenically unsaturated monomer other than the unsaturated nitrile and/or a unit resulting from the hydrogenation of a unit from a conjugated diene. In the rubber, the content of the unit (I) from the unsaturated nitrile is 10 to 60% by weight. If it is less than 10% by weight, the oil resistance of the rubber is inferior. If it exceeds 60% by weight, the cold resistance of the rubber is reduced. The preferred content of the unit (I) is 20 to 50% by weight. The content of the unit (II) from the conjugated diene in the rubber is not more than 10% by weight. If it exceeds 10% by weight, the rubber has inferior resistance to degradation under the action of heat, corrosive gases or treating additives. The preferred content of the unit (II) is 0.5 to 8% by weight, especially 1 to 6% by weight. If it is less than 0.5% by weight, sulfur vulcanization is difficult, and the properties of the resulting rubber material are not entirely satisfactory. The content of the unit (II) may be 0% by weight when it is desired to obtain a rubber containing a monomer other than the conjugated diene as a crosslinking unit. The content of the unit (III) from an ethylenically unsaturated monomer other than the unsaturated nitrile and/or a unit resulting from the hydrogenation of a unit from a conjugated diene is 30 to 90% by weight.

The copolymer rubbers used in this invention include (1) a polymer rubber obtained by partially hydrogenating the conjugated diene unit of an unsaturated nitrile/conjugated diene copolymer rubber, (2) a polymer rubber obtained by partially hydrogenating the conjugated diene unit of an unsaturated nitrile/conjugated diene/ethylenically unsaturated monomer copolymer rubber, (3) an unsaturated nitrile/conjugated diene/ethylenically unsaturated monomer copolymer rubber, (4) an unsaturated nitrile/ethylenically unsaturated monomer copolymer rubber, etc.

Monomers for the production of the copolymer rubbers used in this invention are unsaturated nitriles such as acrylonitrile and methacrylonitrile; conjugated dienes such as butadiene, isoprene and 1,3-pentadiene; ethylenically unsaturated monomers including unsaturated carboxylic acids such as acrylic acid, methacrylic acid, itaconic acid and maleic acid; alkyl esters of carboxylic acids, such as methyl acrylate, 2-ethylhexyl acrylate and octyl acrylate; alkoxyalkyl acrylates such as methoxyethyl acrylate, ethoxyethyl acrylate, and methoxyethoxyethyl acrylate; allyl glycidyl ether and vinyl chloroacetate; ethylene; butene-1; and isobutylene. In the production of an unsaturated nitrile/ethylenically unsaturated monomer copolymer rubber, a part of the unsaturated monomer may be replaced by a non-conjugated diene such as vinyl norbornene, dicyclopentadiene or 1,3-hexadiene.

Specific examples of the copolymer rubber used in this invention include hydrogenation products of a butadiene/acrylonitrile copolymer rubber, an isoprene/acrylonitrile copolymer rubber, and a butadiene/isoprene/acrylonitrile copolymer rubber; a butadiene/methyl acrylate/acrylonitrile copolymer rubber and a butadiene/acrylic acid/acrylonitrile copolymer rubber, and hydrogenation products of these copolymer rubbers; a butadiene/ethylene/acrylonitrile copolymer rubber; a butyl acrylate/ethoxyethyl acrylate/vinyl chloroacetate/acrylonitrile copolymer rubber; and a butyl acrylate/ethoxyethyl acrylate/vinyl norbornene/acrylonitrile copolymer rubber.

The rubber material of this invention should be one obtained by vulcanizing with a sulfur vulcanization system the aforesaid copolymer rubber or a blend of it with an amount of another rubber which does not affect the essence of the present invention. Vulcanization with an organic peroxide cannot achieve the object of this invention. The sulfur vulcanization system in this invention is a combination of a vulcanizer, i.e. sulfur and/or a sulfur-donating compound, with various vulcanization aids and vulcanization accelerators.

Examples of the sulfur donating compound are thiuram-type compounds such as tetramethylthiuram disulfide, tetraethylthiuram disulfide and dipentamethylenethiuram tetrasulfide; morpholine-type compounds such as morpholine disulfide and 2-(4-morpholinodithio)benzothiazole; and compounds which yield active free sulfur under the action of heat, such as selenium dimethyldithiocarbamate, selenium diethyldithiocarbamate, alkylphenol disulfides and aliphatic polysulfide polymers. The vulcanization aids and accelerators may be those which provide a sufficient vulcanized state when used in combination with sulfur and/or the sulfur donating compound. Those which are usually employed in the rubber industry can be used in this invention without limitation. Examples of the vulcanization aids are metal oxides such as zinc oxide and magnesium oxide, stearic acid, oleic acid, and zinc stearate. Examples of the vulcanization accelerators are guanidine-type accelerators such as diphenylguanidine; thiazole-type accelerators such as mercaptobenzothiazole and dibenzothiazyl disulfide; sulfenamide-type accelerators such as N-cyclohexyl-2-benzothiazyl sulfenamide and N,N'-dicyclohexyl-2-benzothiazylsulfenamide; thiuram-type accelerators such as tetramethylthiuram monosulfide and tetramethylthiuram disulfide; and dithioacid salt-type accelerators such as dizinc dimethyldithiocarbamate.

The rubber material of this invention may, as desired, contain reinforcing agents, fillers, plasticizers, antioxidants, and other compounding agents normally used in the rubber industry.

The rubber used in this invention is mixed with the sulfur vulcanization system and other compounding ingredients and kneaded by an ordinary mixer to form a rubber stock. The rubber stock is molded, either as such or after inserting a metallic reinforcing layer or a fiber cord reinforcing layer therein, into a desired shape such as a sheet, hose, tube or belt by ordinary molding machines, and then subjected to vulcanization means such as press vulcanization or can vulcanization. Thus, the rubber material of this invention is produced.

In order to achieve the object of this invention, the rubber material of this invention should be in an optimum vulcanized state in which its tensile strength is nearly at a maximum and its initial tensile strength in a heat aging test does not markedly increase as a result of secondary vulcanization proceeding during use. There is no restriction on the vulcanization conditions, such as the amounts of the vulcanizer and the vulcanization accelerator, the vulcanization temperature and the vulcanization time, for providing an optimum vulcanized state. When the optimum vulcanized state cannot be obtained under ordinary vulcanizing conditions, secondary vulcanization may be performed to obtain it.

Specifically, the rubber material of this invention may, for example, be various packers for use in obtaining impressions in wells, cables for oil pumps, sealing materials such as O-rings and B.O.P. (Blowout-Preventor), hoses, belts, and diaphragms. It can be in the form of any articles which are used in contact with casing head gas and/or crude oils and/or treating additives.

The following examples illustrate the present invention more specifically.

EXAMPLE 1

An acrylonitrile/butadiene copolymer rubber (bound acrylonitrile content 37% by weight or 45% by weight; to be abbreviated NBR) was hydrogenated at its butadiene unit in the presence of Pd-carbon catalyst in solution. Thus, four kinds of hydrogenated NBR shown in Table 1 were prepared. The proportion of the hydrogenated butadiene unit was measured by the iodination method in accordance with JIS-K0070.

TABLE 1

| Sample No. | Bound acrylonitrile content (% by weight) | Hydrogenated butadiene unit (wt. %) | Butadiene unit (wt. %) |
|---|---|---|---|
| 1 | 37.0 | 51.0 | 12.0 |
| 2 | 37.0 | 54.2 | 8.8 |
| 3 | 45.0 | 47.3 | 7.7 |
| 4 | 37.0 | 57.3 | 5.7 |

To 100 parts by weight of each of the hydrogenated NBR (samples 1 to 4) were added 5 parts by weight of zinc oxide (#3), 1 part by weight of stearic acid and 40 parts by weight of FEF carbon black, and either (1) a sulfur vulcanization system (to be abbreviated as a sulfur system) composed of 0.5 part by weight of sulfur, 2 parts by weight of tetramethylthiuram disulfide and 0.5 part by weight of 2-mercaptobenzothiazole, or (2) an organic peroxide vulcanization system (to be abbreviated as a PO system) composed of 4 parts by weight of dicumyl peroxide. The mixture was kneaded on a 6-inch roll mill. In the case of using the sulfur system, the resulting rubber stock was press-cured at 160° C. for 30 minutes, and then secondarily cured at 150° C. for 24 hours. In the case of using the PO system, the rubber stock was press-cured at 160° C. for 30 minutes. Sheets having a thickness of 2 mm were thus prepared in both cases. Dumbbell-shaped test samples were punched out from the sheets in accordance with JIS K-6301, and their casing head gas resistance, oil resistance and resistance to treating additives were measured.

By usual emulsion polymerization, the butadiene/butyl acrylate/acrylonitrile copolymer rubbers (abbreviated NBAR) shown in Table 2 were prepared.

TABLE 2

| Sample No. | Bound acrylonitrile content (wt. %) | Butyl acrylate unit (wt. %) | Butadiene unit (wt. %) |
|---|---|---|---|
| 5 | 55 | 30 | 15 |
| 6 | 30 | 62 | 8 |

The samples 5 and 6 were press-cured at 160° C. for 30 minutes using the sulfur system. The cured products were tested in the same way as above.

The substances described in each of I, II and III below were filled in a vessel (a 0.5 liter autoclave in the case of I; and a 1-liter autoclave in the case of II and III), and the test samples were each dipped therein in accordance with the dipping test methods stipulated in JIS-K-6301. The vessel was heated to 150° C., and after dipping for 7 days, the tensile strengths of the samples in a wet condition were measured. The results are indicated in Table 3 in indices by taking the measured tensile strengths before dipping as 100.

I. Casing head gas resistance (1) A gaseous mixture obtained by adding 1000 ppm of $H_2S$ and 1000 ppm of $H_2$ to $CO_2$ atmosphere.
(2) A gaseous mixture obtained by adding 1000 ppm of $H_2O$ to a $H_2S/CH_4/CO_2$ mixture (mole ratio 35/55/10).
(3) Steam II. Oil resistance (1) ASTM No. 2 oil
(2) Diesel oil
(3) Crude oil (55% by weight of Arabian Light and 45% by weight of Qatar Dukhan oil)

III. Resistance to treating additives

To diesel oil, 20% by weight of the following substances were added.
(1) Acetic acid
(2) Acetamide
(3) 25% aqueous solution of NaCl
(4) 25% by weight aqueous solution of NaOH
(5) $H_2S$

TABLE 3

| | Comparison | | | | | | | Invention | | | | Reference | | |
|---|---|---|---|---|---|---|---|---|---|---|---|---|---|---|
| Run No. | 1 | 2 | 3 | 4 | 5 | 6 | 7 | 8 | 9 | 10 | 11 | 12 | 13 | 14 |
| Type of rubber | NBR | 1 | 5 | 2 | 6 | 3 | 4 | 2 | 6 | 3 | 4 | ACM | FKM | EPDM |
| Vulcanization system | Sulfur | Sulfur | Sulfur | PO | PO | PO | PO | Sulfur | Sulfur | Sulfur | Sulfur | — | — | — |
| Tensile strength before testing (kg/cm$^2$) | 225 | 210 | 197 | 205 | 212 | 196 | 223 | 296 | 275 | 315 | 332 | 121 | 128 | 140 |
| | 100 | 100 | 100 | 100 | 100 | 100 | 100 | 100 | 100 | 100 | 100 | 100 | 100 | 100 |
| Casing head gas resistance (150° C. × 7 days) | | | | | | | | | | | | | | |
| (1) CO$_2$/H$_2$O/H$_2$S | 32 | 35 | 27 | 79 | 82 | 92 | 92 | 92 | 93 | 104 | 99 | 5 | 71 | 65 |
| (2) H$_2$S/CH$_4$/CO$_2$ | 0 | 0 | 0 | 89 | 93 | 95 | 96 | 92 | 91 | 97 | 100 | 26 | 82 | 78 |

TABLE 3-continued

| | Comparison | | | | | | | Invention | | | | Reference | | |
|---|---|---|---|---|---|---|---|---|---|---|---|---|---|---|
| Run No. | 1 | 2 | 3 | 4 | 5 | 6 | 7 | 8 | 9 | 10 | 11 | 12 | 13 | 14 |
| (3) Steam | 45 | 58 | 25 | 86 | 87 | 88 | 97 | 89 | 90 | 96 | 99 | 0 | 22 | 38 |
| Oil resistance (150° C. × 7 days) | | | | | | | | | | | | | | |
| (1) ASTM No. 2 oil | 91 | 89 | 88 | 75 | 78 | 84 | 88 | 102 | 103 | 100 | 100 | 107 | 86 | 30 |
| (2) Diesel oil | 94 | 91 | 94 | 79 | 80 | 80 | 81 | 93 | 92 | 100 | 100 | 107 | 91 | 51 |
| (3) Crude oil | 88 | 85 | 78 | 58 | 60 | 65 | 69 | 93 | 107 | 103 | 101 | 72 | 49 | 5 |
| Resistance to treating additives (150° C. × 7 days) | | | | | | | | | | | | | | |
| (1) Acetic acid | 123 | 138 | 140 | 76 | 77 | 80 | 85 | 104 | 105 | 103 | 99 | 30 | 36 | 25 |
| (2) Acetamide | 85 | 86 | 78 | 77 | 78 | 83 | 88 | 92 | 108 | 98 | 99 | 14 | 28 | 8 |
| (3) Aqueous NaCl solution | 49 | 32 | 44 | 76 | 77 | 78 | 79 | 104 | 108 | 103 | 98 | 11 | 101 | 24 |
| (4) Aqueous NaOH solution | 68 | 72 | 56 | 82 | 81 | 83 | 85 | 107 | 91 | 101 | 100 | 22 | 59 | 38 |
| (5) $H_2S$ | 41 | 38 | 29 | 75 | 76 | 81 | 84 | 92 | 91 | 105 | 100 | 63 | 78 | 11 |

(*)NBR: Nipol 1042 (bound acrylonitrile content 33% by weight) a product of Nippon Zeon Co., Ltd.
ACM: Nipol AR42(acrylic rubber), a product of Nippon Zeon Co., Ltd.
FKM: Technoflon FOR 70 (fluorine rubber), a product of Monte-Edison
EPDM: Esprene 501A (ethylene/propylene/diene monomer copolymer rubber), a product of Sumitomo Chemical Co., Ltd.

The results given in Table 3 demonstrate that when the rubber materials used in this invention are vulcanized with sulfur vulcanization systems, they have much higher mechanical strength (tensile strength) than when they are vulcanized with an organic peroxide, and their mechanical strengths show little or no reduction after they are subjected to various tests.

EXAMPLE 2

In each run, a rubber stock was prepared in accordance with the compounding recipe shown in Table 4 by the same operation as in Example 1. The rubber stock was then press-cured to form a cured sheet having a thickness of 2 mm. The vulcanized sheet was subjected to the same dipping tests and the same heat aging test in air (Geer's oven, 150° C., 14 days) as in Example 1. The results are shown in Table 5.

TABLE 4

| | Compounding recipe (parts by weight) | | | |
|---|---|---|---|---|
| | | Vulcanization system | | |
| Compounding agents (parts by weight) | PO | Sulfur (a) | Sulfur (b) | Sulfur (c) |
| Rubber (see Table 5) | 100 | 100 | 100 | 100 |
| Zinc oxide (#3) | 5 | 5 | 5 | 5 |
| Stearic acid | 1 | 1 | 1 | 1 |
| FEF carbon | 40 | 40 | 40 | 40 |
| Dicumyl peroxide (40% purity) | 10 | — | — | — |
| Sulfur | — | 5 | 0.5 | — |
| Tetramethylthiuram monosulfide | — | 1 | — | — |
| Tetramethylthiuram disulfide | — | — | 2 | 2 |
| 2-Mercaptobenzothiazole | — | — | 0.5 | 0.5 |
| Dimorpholine disulfide | — | — | — | 2 |

TABLE 5

| | Comparison | | | Invention | | | |
|---|---|---|---|---|---|---|---|
| Run No. | 15 | 16 | 17 | 18 | 19 | 20 | 21 |
| Type of rubber | NBR | 3 | 4 | 3 | 4 | 4 | 4 |
| Vulcanization system | Sulfur (b) | PO | PO | Sulfur (a) | Sulfur (a) | Sulfur (b) | Sulfur (c) |
| Properties in a normal condition | | | | | | | |
| Tensile strength (kg/cm²) | 225 | 197 | 238 | 305 | 312 | 336 | 358 |
| Tensile strength B type (kg/cm) | 33 | 40 | 45 | 58 | 61 | 66 | 78 |
| Elongation (%) | 410 | 370 | 420 | 400 | 460 | 530 | 550 |
| Hardness JIS (point) | 70 | 72 | 69 | 70 | 70 | 72 | 71 |
| Heat resistance (Geer's oven, 150° C. × 14 days) | | | | | | | |
| Percent change in tensile strength (%) | Un-measurable | +30 | +32 | +6 | +4 | +3 | +3 |
| Percent change in elongation (%) | Un-measurable | −41 | −45 | −10 | −8 | −6 | −4 |
| Change in hardness (point) | Un-measurable | +12 | +13 | +5 | +3 | +2 | +1 |
| Casing head gas resistance (150° C. × 7 days) | | | | | | | |
| (1) $H_2S/CH_4/CO_2$ | | | | | | | |
| Percent change in tensile strength (%) | Un-measurable | −5 | −3 | −6 | −3 | +1 | −2 |
| Percent change in elongation (%) | Un-measurable | −7 | −8 | −8 | −7 | −3 | −2 |
| Change in hardness (point) | Un-measurable | +2 | +1 | +1 | +2 | +1 | +1 |
| (2) Steam | | | | | | | |
| Percent change in tensile strength (%) | Un-measurable | −9 | −10 | −4 | −5 | −4 | −2 |
| Percent change in elongation (%) | Un-measurable | −10 | −11 | −3 | −7 | −6 | −2 |
| Change in hardness (point) | Un-measurable | −8 | −10 | −3 | −4 | −3 | −1 |
| Oil resistance (150° C. × 7 days) | | | | | | | |
| (1) ASTM No. 3 oil | | | | | | | |
| Percent change in tensile strength (%) | −31 | −34 | −29 | −10 | −5 | −2 | −1 |
| Percent change in elongation (%) | −28 | −28 | −26 | −11 | −7 | −5 | −3 |
| Percent change in volume (%) | +28 | +38 | +36 | +19 | +15 | +14 | +12 |
| (2) Diesel oil | | | | | | | |

TABLE 5-continued

| Run No. | Comparison | | | Invention | | | |
|---|---|---|---|---|---|---|---|
| | 15 | 16 | 17 | 18 | 19 | 20 | 21 |
| Percent change in tensile strength (%) | −26 | −24 | −19 | −8 | −4 | −3 | −2 |
| Percent change in elongation (%) | −20 | −28 | −29 | −10 | −10 | −9 | −4 |
| Percent change in volume (%) | +29 | +35 | +31 | +18 | +15 | +13 | +13 |
| (3) Crude oil | | | | | | | |
| Percent change in tensile strength | −35 | −38 | −35 | −5 | +4 | +2 | +4 |
| Percent change in elongation (%) | −34 | −32 | −34 | −4 | −5 | −2 | −2 |
| Percent change in volume (%) | +32 | +42 | +41 | +20 | +19 | +20 | +20 |
| Resistance to treating additives (150° C. × 7 days) | | | | | | | |
| (1) Aqueous NaCl solution | | | | | | | |
| Percent change in tensile strength (%) | Un-measurable | −28 | −30 | +6 | +10 | +1 | −2 |
| Percent change in elongation (%) | | −35 | −34 | −12 | −16 | −5 | −4 |
| Percent change in volume (%) | | +42 | +41 | +21 | +25 | +21 | +20 |
| (2) H$_2$S | | | | | | | |
| Percent change in tensile strength (%) | Un-measurable | −24 | −28 | −5 | −4 | +2 | +1 |
| Percent change in elongation (%) | | −30 | −32 | −10 | −8 | −4 | −2 |
| Percent change in volume (%) | | +38 | +35 | +20 | +15 | +13 | +13 |
| (3) Sour diesel oil (containing 3 wt. % lauroyl hydroperoxide) | | | | | | | |
| Percent change in tensile strength (%) | Un-measurable | −70 | −65 | −10 | −8 | −2 | −2 |
| Percent change in elongation (%) | | −72 | −56 | −11 | −7 | −5 | −3 |
| Percent change in volume (%) | | +41 | +38 | +18 | +15 | +14 | +13 |

The results given in Table 5 demonstrate that rubber materials of this invention obtained by vulcanizing hydrogenated NBR with sulfur vulcanization systems have much better mechanical strengths (tensile strength and tear strength), heat resistance, casing head gas resistance, oil resistance and resistance to treating additives than rubber materials obtained by vulcanizing the same hydrogenated NBR with organic peroxide vulcanization systems.

EXAMPLE 3

A copolymer rubber having the below composition was prepared by partially hydrogenating the butadiene unit of Sample No. 5 (acrylonitrile/butyl acrylate/butadiene) in Table 2 on page 13 of the specification of this application:

| | |
|---|---|
| Bound acrylonitrile content | 55 wt. % |
| Butyl acrylate unit | 30 wt. % |
| Butadiene unit | 8 wt. % |
| Hydrogenated butadiene unit | 7 wt. % |

A rubber material (Dumbbell-shaped sheet) was made by use of the above copolymer rubber in accordance with the formulation in Example 1 and the same tests as in Example 1 were conducted. The results of the tests are shown in Table 6.

TABLE 6

| Run No. | Invention 22 | Comparison 23 |
|---|---|---|
| Vulcanization system | Sulfur | PO |
| Tensile strength before testing (kg/cm$^2$) | 280 (= 100) | 230 (= 100) |
| Casing head gas resistance (150° C. × 7 days) | | |
| (1) CO$_2$/H$_2$O/H$_2$S | 89 | 90 |
| (2) H$_2$S/CH$_4$/CO$_2$ | 91 | 91 |
| (3) Steam | 93 | 91 |
| Oil resistance (150° C. × 7 days) | | |
| (1) ASTM No. 2 oil | 92 | 84 |
| (2) Diesel oil | 99 | 82 |
| (3) Crude oil | 102 | 76 |
| Resistance to treating additives (150° C. × 7 days) | | |
| (1) Acetic Acid | 108 | 94 |
| (2) Acetamide | 89 | 85 |
| (3) Aqueous NaCl solution | 93 | 80 |
| (4) Aqueous NaOH solution | 95 | 88 |
| (5) H$_2$S | 99 | 95 |

What is claimed is:

1. A method for preventing degradation and deterioration of vulcanized rubber materials forming a rubber article used in the operation of oil or gas wells and which come into contact with at least one substance selected from the group consisting of casing head gas, crude oil and natural gas, which substance contains therein corrosive gases including at least CO$_2$ and at least one of H$_2$S and SO$_2$, said method comprising using as the vulcanized rubber material forming said rubber article a sulfur-vulcanized copolymer rubber composition wherein the polymer chain of said copolymer rubber includes the following units:

(I) 10 to 60% by weight of a unit from an unsaturated nitrile selected from the group consisting of acrylonitrile and methacrylonitrile;

(II) up to 10% by weight of a unit from a conjugated diene selected from the group consisting of butadiene, isoprene and 1,3-pentadiene; and (III) 30 to 90% by weight of at least one of
  (i) a unit from ethylenically unsaturated monomer selected from the group consisting of acrylic acid, methacrylic acid, itaconic acid, maleic acid, methylacrylate, 2-ethylhexylacrylate, octylacrylate, methoxyethyl acrylate, ethoxyethylacrylate, methoxyethoxyethyl acrylate, allyl glycidyl ether, vinyl chloroacetate, ethylene, butene-1, and isobutylene;
  (ii) a unit resulting from the hydrogenation of a conjugated diene selected from the group consisting of butadiene, isoprene, and 1,3-pentadiene; and
  (iii) mixtures of units (i) and (ii).

2. The method of claim 1 wherein the copolymer rubbers are composed of 20 to 50% by weight of the unit (I), 0.5 to 8% by weight of the unit (II), and 30 to 90% by weight of the unit (III).

3. The method of claim 1 wherein the copolymer rubber is selected from the group consisting of an hydrogenation product of a butadiene/acrylonitrile copolymer rubber, an hydrogenation product of an isoprene/acrylonitrile copolymer rubber, an hydrogenation product of a butadiene/isoprene/acrylonitrile copolymer rubber, a butadiene/methacrylate/acrylonitrile copolymer rubber, a butadiene/acrylic acid/acrylonitrile copolymer rubber, an hydrogenation product of a butadiene/isoprene/acrylonitrile copolymer rubber, an hydrogenation product of a butadiene/methylacrylate/acrylonitrile copolymer rubber, an hydrogenation product of a butadiene/acrylic acid/acrylonitrile copolymer rubber, a butadiene/ethylene/acrylonitrile copolymer rubber, a butylacrylate/ethoxyethylacrylate/vinyl chloroacetate/acrylonitrile copolymer rubber, and a butylacrylate/ethoxyethylacrylate/vinyl norbornene/acrylonitrile copolymer rubber.

4. The method of claim 1 wherein the copolymer rubber is an acrylonitrile/hydrogenated butadiene/butadiene copolymer rubber.

5. The method of claim 1 wherein the copolymer rubber is an acrylonitrile/butylacrylate/butadiene copolymer rubber.

6. The method of claim 1 wherein the copolymer rubber is a copolymer of acrylonitrile, butylacrylate, butadiene, and hydrogenated butadiene.

* * * * *